Dec. 8, 1931.  H. MADISON  1,835,659
TRACTION CHAIN FOR VEHICLES
Filed Aug. 8, 1930  2 Sheets-Sheet 1

Inventor
Harry Madison
By *Arthur H. Sturges*
Attorney

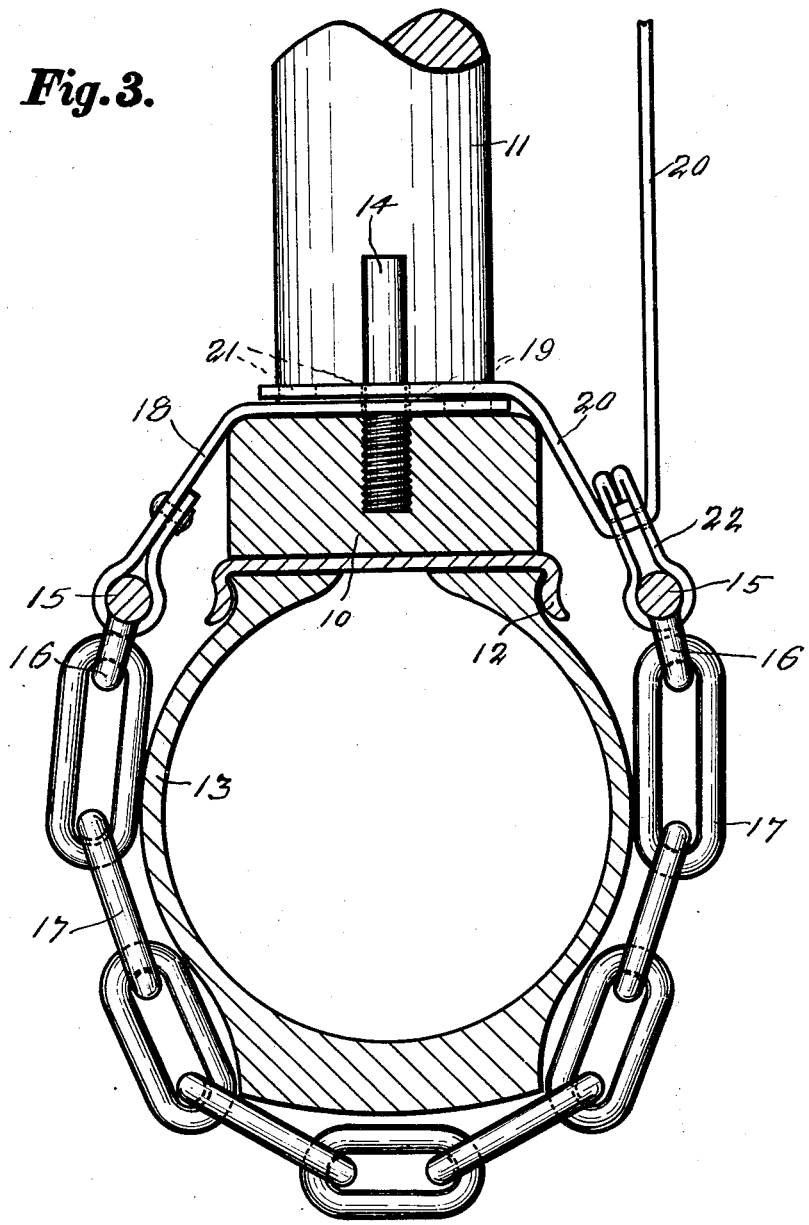

Patented Dec. 8, 1931

1,835,659

UNITED STATES PATENT OFFICE

HARRY MADISON, OF COUNCIL BLUFFS, IOWA

TRACTION CHAIN FOR VEHICLES

Application filed August 8, 1930. Serial No. 473,935.

The present invention relates to traction devices adapted for application to pneumatic tires and the wheels carrying the same, and has for an object to provide a device of this character which may be quickly and easily applied to the tire and wheel without jacking up the latter from the ground.

Another object of the present invention is to provide a traction device which embodies a structure carrying cross chains and which is made in sections adapted to be independently applied to the portions of the tire and wheel whereby the wheel may be turned to expose different portions thereof for application of the different sections of the device.

A further object of the invention is to provide a traction device of this character having securing means therefor which is operable wholly at the outer side of the wheel.

With the foregoing and other objects in view, the invention will be more fully described hereinafter, and will be more particularly pointed out in the claims appended hereto.

In the drawings, wherein like symbols refer to like or corresponding parts throughout the several views.

Figure 3 is an enlarged transverse section through a portion of the wheel and tire and showing the improved traction device applied thereto.

Figure 1:
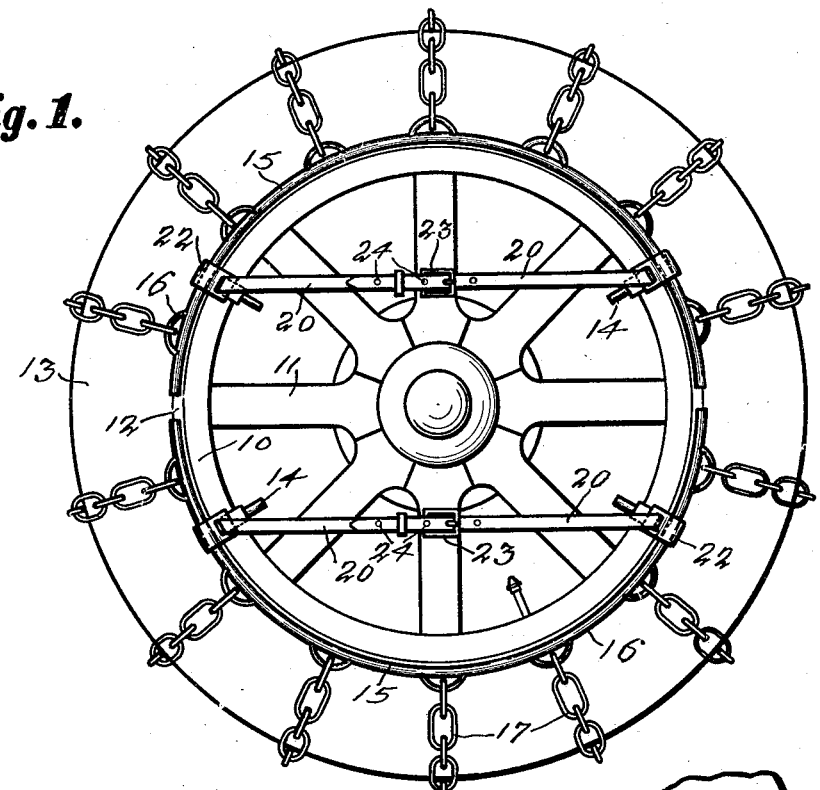
Figure 1 is a side elevation of an automobile wheel equipped with a tire and having the traction device of the invention applied thereto and showing the outer side of the wheel.
Figure 2:
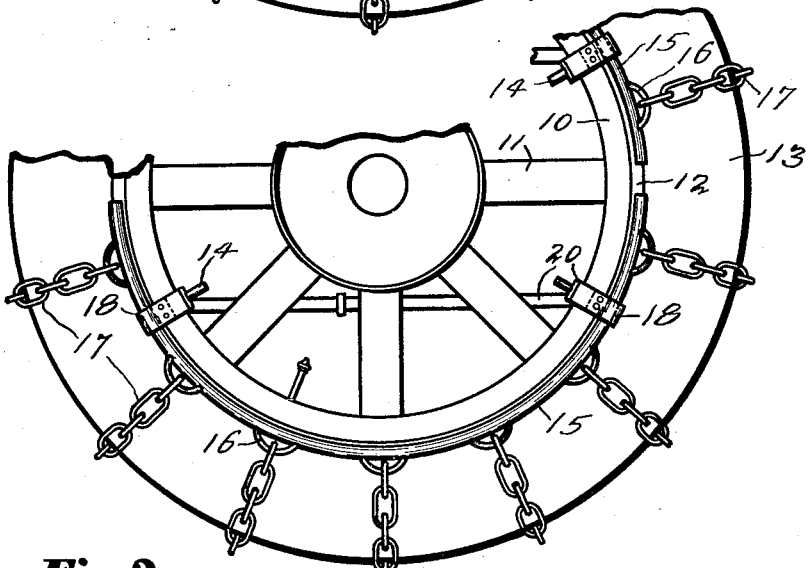
Figure 2 is a like view of the inner side of the wheel, partly broken away.

Referring to the drawings, 10 designates the felly of a wheel shown as of the artillery type and provided with spokes 11. The felly 10 carries a rim 12 upon which is mounted the shoe 13 of a pneumatic tire.

As shown in the present embodiment the traction device comprises a pair of substantially semicircular members, and for each member the felly 10 is provided with a pair of anchoring pins 14 which may be threaded so as to engage in threaded openings formed in the inner side or face of the felly near the opposite ends of the adjacent section of the device.

Each section of the device comprises a pair of curved bars 15, one adapted to lie against each side of the tire 13. The bars 15 carry loops 16 preferably integral therewith and which are spaced throughout the lengths of the bars and to which are attached cross chains 17 adapted to extend over the tread portion of the tire 13. The bar 15, which is adapted to be placed against the inner side of the tire 13, is provided near each end with an anchoring band 18 which at one end is looped about the bar 15 and riveted to pivotally connect the band to the bar. The free end of the band 18 is provided with a desired number of apertures 19 for selectively engaging over an adjacent anchoring pin 14 so as to hold the inner curved bar 15 in the desired position against the inner side of the tire.

A flexible band 20, preferably of rubberized canvas or the like is provided in one end with a number of apertures 21 adapted to be selectively engaged over the anchoring pin 14 in superposed relation to the band 18, the strap or band 20 being carried outwardly of the wheel and looped through a pivoted connector 22 which is mounted on the opposite curved bar 15 in register with the inner pivoted end of the band 18. The connector 22 may comprise a piece of strap metal overturned upon itself and rounded to engage the bar 15 and provided with apertures or slots in its free ends for receiving the strap 20 as shown in Figure 3.

A similar construction prevails at the opposite end of the section of the traction device, and one of the straps 20 is provided with a buckle 23 while the other strap has apertures 24 therethrough for co-operation with the buckle to hold the straps 20 when drawn taut across the outer side of the wheel.

The traction device comprises a pair of these sections which are similar in construction and it is evident that the upper or free half of the wheel may be equipped with one of these traction sections by first anchoring the bands 18 on the pins 14 and swinging the section over the tread of the tire so as to bring the opposite bar 15 against the outer side thereof.

The straps 20 are now engaged through the connectors 22 and adjusted over the anchoring pins 14. The straps 20 are then drawn taut and secured by the buckle 23 to hold the traction device firmly to the exposed half of the wheel. The vehicle may now be moved sufficiently to turn the said traction section down into contact with the roadway and to expose the opposite portion of the wheel and tire. The other section of the traction device is now applied in a similar manner and the wheel is thus equipped with the uniformly located traction devices so that the wheel carries the cross chains 17 in substantially equi-distantly spaced apart relation throughout the entire circumferential length of the tire tread.

It is apparent that the traction device may be quickly and easily removed from the tire by merely releasing the buckles 23 and removing the straps 20 from the pins 14 when the sections are turned on the tire upwardly out of contact with the ground.

It is obvious that various changes and modifications may be made in the details of construction and design of the above specifically described embodiment of this invention without departing from the spirit thereof, such changes and modifications being restricted only by the scope of the following claims.

What is claimed is:—

1. A traction device for wheels comprising a pair of substantially semi-circular sections, each section having a pair of curved bars adapted to be placed at opposite sides of a wheel, cross chains carried by the bars for engagement over the tread of a tire, anchoring pins adapted to be secured in the wheel, anchoring bands carried by one of said curved bars for detachable engagement with the pins, flexible bands for engagement with said pins and adapted to be slidably connected to the opposite curved bar, and means for holding said flexible bands in taut relation for binding the section about the tire.

2. A traction device for wheels having tires thereon, comprising a plurality of sections, each section having curved side bars, pins for permanent position in the felly of the wheels between the spokes thereof, bands carried on one curved bar of each section and having openings therein for engagement over the anchoring pins to hold the inner side of each section against the inner side of the tire, connectors carried upon the other curved bar of each section and having openings therethrough, and retaining straps threaded through said openings and adapted for adjustable engagement over said anchoring pins, the straps of each section adapted to be secured together for holding the respective sections taut over the tread of the tire.

3. A traction device for wheels comprising a pair of substantially semi-circular sections, each section having a pair of curved bars adapted to be placed at opposite sides of a wheel, cross chains carried by the bars for engagement over the tread of a tire, anchoring means engaging the wheel between two adjacent spokes, anchoring bands carried by one of said curved bars for detachable engagement with the anchoring means, flexible bands for engagement with said anchoring means and adapted to be slidably connected to the opposite curved bar, and means for holding said flexible bands in taut relation for binding the section about the tire.

In testimony whereof, I have affixed my signature.

HARRY MADISON.